(12) United States Patent
Pothier

(10) Patent No.: US 9,604,713 B2
(45) Date of Patent: Mar. 28, 2017

(54) DOOR MIGRATION PREVENTION SYSTEM

(71) Applicant: Bell Helicopter Textron Inc., Fort Worth, TX (US)

(72) Inventor: Steve Pothier, Blainville (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 334 days.

(21) Appl. No.: 14/060,040

(22) Filed: Oct. 22, 2013

(65) Prior Publication Data
US 2015/0108275 A1    Apr. 23, 2015

(51) Int. Cl.
| | | |
|---|---|---|
| *B64C 1/14* | (2006.01) | |
| *E05F 15/632* | (2015.01) | |
| *E05D 15/06* | (2006.01) | |
| *E05D 13/00* | (2006.01) | |
| *E06B 3/46* | (2006.01) | |
| *E05B 17/00* | (2006.01) | |
| *E05B 77/36* | (2014.01) | |

(Continued)

(52) U.S. Cl.
CPC .......... *B64C 1/1407* (2013.01); *B64C 1/1438* (2013.01); *B64C 27/04* (2013.01); *E05B 17/0025* (2013.01); *E05B 77/36* (2013.01); *E05D 13/00* (2013.01); *E05D 15/0621* (2013.01); *E05D 15/0665* (2013.01); *E05D 15/0686* (2013.01); *E05F 15/632* (2015.01); *E06B 3/4636* (2013.01); *E05B 2015/107* (2013.01); *E05D 2700/00* (2013.01)

(58) Field of Classification Search
CPC ...... E05C 19/00; E05F 15/632; E06B 3/4636; E05B 17/0025; B64C 1/1407; B64C 1/1438; E05D 15/0665; E05D 15/0621; E05D 13/00; E05D 15/0686; E05D 2700/00
USPC ....................................... 244/129.5
See application file for complete search history.

(56) References Cited

U.S. PATENT DOCUMENTS

| | | | |
|---|---|---|---|
| 1,654,256 A | | 12/1927 | Hill et al. |
| 3,791,073 A | * | 2/1974 | Baker ............................. 49/249 |

(Continued)

FOREIGN PATENT DOCUMENTS

| | | |
|---|---|---|
| DE | 1218290 B | 6/1966 |
| DE | 1942566 | 3/1971 |

(Continued)

OTHER PUBLICATIONS

DE3738367 English translation (Machine genertated), 9 pages.*

(Continued)

Primary Examiner — Brian M O'Hara
Assistant Examiner — Assres H Woldemaryam

(57) ABSTRACT

According to some embodiments, a door system includes a door attachment device and a receiver. The door attachment device may be coupled to a door, and the receiver may be coupled to a door frame. A receiving surface of the receiver may be configured to at least partially receive the door attachment device along a first axis. The receiving surface may have a non-planar portion curved relative to the first axis such that the receiving surface responds to movement of the door attachment device in a direction parallel to a second axis, the second axis perpendicular to the first axis, by repositioning the door attachment device in a third direction perpendicular to the plane formed by the first axis and the second axis.

20 Claims, 7 Drawing Sheets

(51) Int. Cl.
  *B64C 27/04* (2006.01)
  *E05B 15/10* (2006.01)

(56) References Cited

U.S. PATENT DOCUMENTS

| | | | | |
|---|---|---|---|---|
| 4,497,462 | A * | 2/1985 | Hamatani | 244/129.5 |
| 5,199,369 | A * | 4/1993 | Meyer et al. | 114/117 |
| 5,289,615 | A * | 3/1994 | Banks et al. | 16/366 |
| 5,305,969 | A * | 4/1994 | Odell et al. | 244/129.5 |
| 6,123,370 | A * | 9/2000 | Rozema et al. | 292/47 |
| 6,168,114 | B1 * | 1/2001 | Erben | 244/129.5 |
| 6,477,810 | B2 * | 11/2002 | Van De Keuken | 49/395 |
| 8,146,864 | B2 * | 4/2012 | Koppel et al. | 244/129.5 |
| 8,322,759 | B2 * | 12/2012 | Okabe et al. | 292/144 |
| 2002/0096602 | A1 * | 7/2002 | Dazet et al. | 244/129.5 |
| 2002/0139897 | A1 * | 10/2002 | Erben et al. | 244/129.5 |
| 2003/0006343 | A1 * | 1/2003 | Senger | 244/129.5 |
| 2003/0141415 | A1 * | 7/2003 | Leclerc | 244/129.5 |
| 2004/0262454 | A1 * | 12/2004 | Lehmbecker et al. | 244/129.5 |

FOREIGN PATENT DOCUMENTS

| | | | |
|---|---|---|---|
| DE | 3738367 | A1 * | 5/1989 |
| EP | 2236411 | A1 * | 10/2010 |
| FR | 2636666 | A1 | 3/1990 |
| WO | 2005012081 | A1 | 2/2005 |

OTHER PUBLICATIONS

European Search Report in related European Application No. 14150745.9, dated May 19, 2014, 3 pages.
Official Action in related European Application No. 14150745.9, dated Jun. 3, 2014, 6 pages.
Communication in related European Application No. 14150745.9, dated May 12, 2015, 5 pages.
Communication Under Rule 71(3) EPC in related European Patent Application No. 14150745.9, dated May 11, 2015, 22 pages.

* cited by examiner

DOOR MIGRATION PREVENTION SYSTEM

TECHNICAL FIELD

This invention relates generally to door systems, and more particularly, to a door migration prevention system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to prevent or reduce migration of doors due to vibration.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
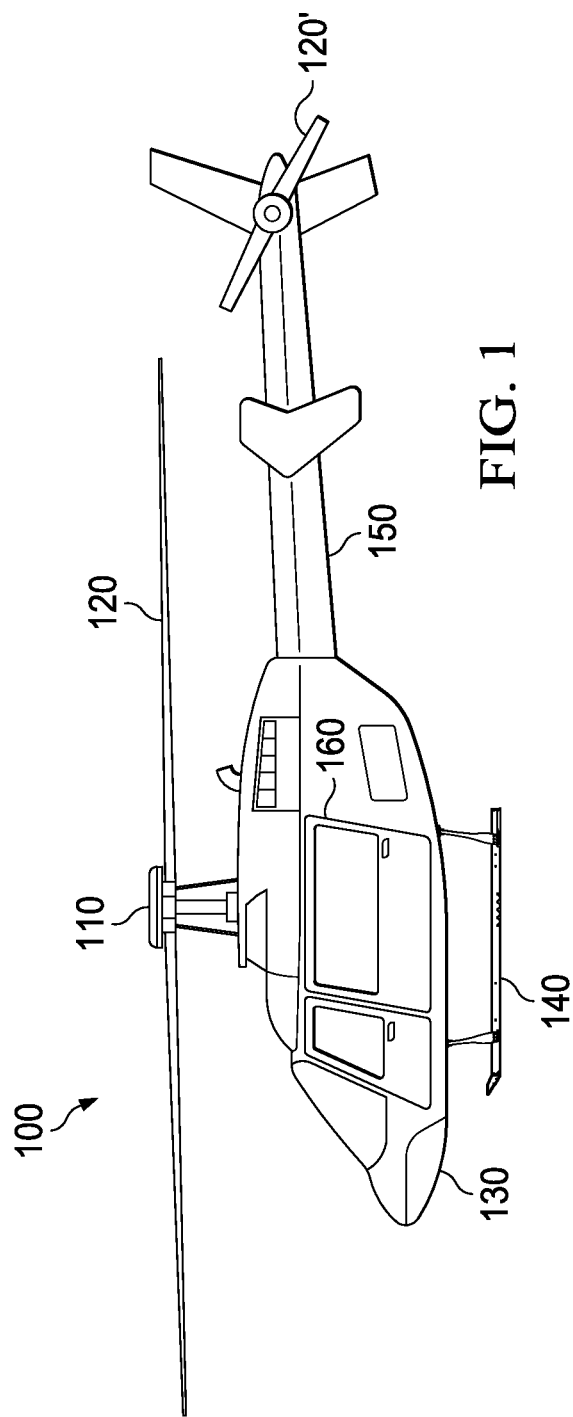
FIG. 1 shows a rotorcraft according to one example embodiment.

FIG. 1 shows a rotorcraft 100 according to one example embodiment. In the example of FIG. 1, rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments recognize that blades 120' may represent one example of a secondary rotor system; other examples may include, but are not limited to, forward-thrust propellers (e.g., pusher propellers, tractor propellers, etc.), tail anti-torque propellers, ducted rotors, and ducted fans mounted inside and/or outside the rotorcraft.

Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIG. 1. For example, rotor system 110 may include components such as a power train, drive shafts, a hub, a swashplate, and pitch links.

In some embodiments, rotorcraft 100 also features a door 160. In the example of FIG. 1, door 160 is a sliding side door. In this example, rotorcraft 100 may also feature a door-sliding system configured to slide door 160 from an open position to a closed position.

During operation of rotorcraft 100, door 160 may be subject to various vibrations and other forces. These forces may cause door 160 to migrate away from a center position. Migration of door 160, however, may result in a variety of issues, such as unwanted gaps between door 160 and the door frame, failure of door 160 (e.g., fatigue failure of door components), and noise due to vibration of door 160.

Accordingly, teachings of certain embodiments recognize the capability to prevent or reduce migration of doors such as door 160. Teachings of certain embodiments recognize the capability to prevent migration of doors in a variety of environments, such as aircraft doors (e.g., rotorcraft doors) where vibrations may be prevalent.

Figure 2:
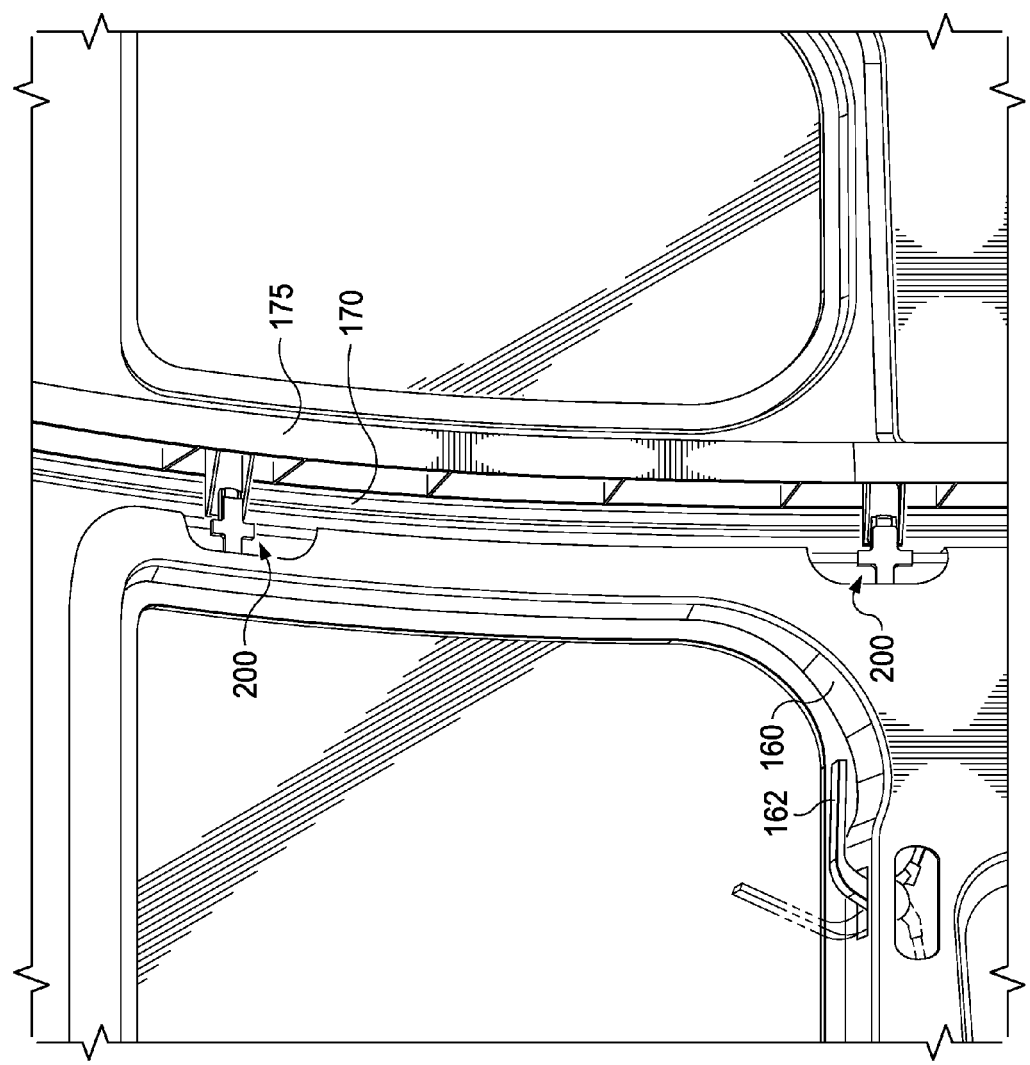
FIG. 2 shows the door of the rotorcraft of FIG. 1 and two door latch systems according to one example embodiment.
Figure 3:
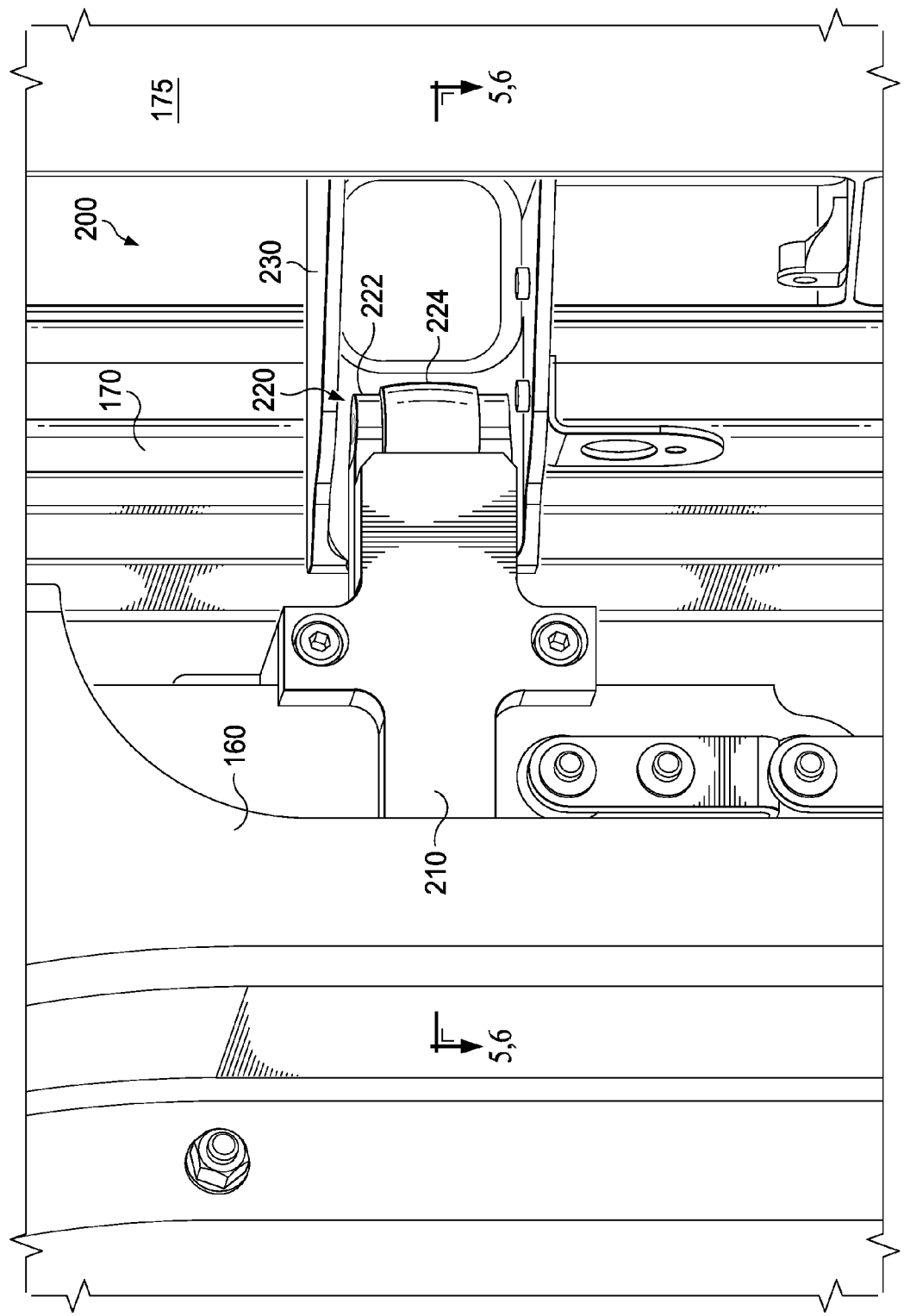
FIG. 3 shows a detailed perspective view of one of the door latch systems of FIG. 2.
Figure 4:
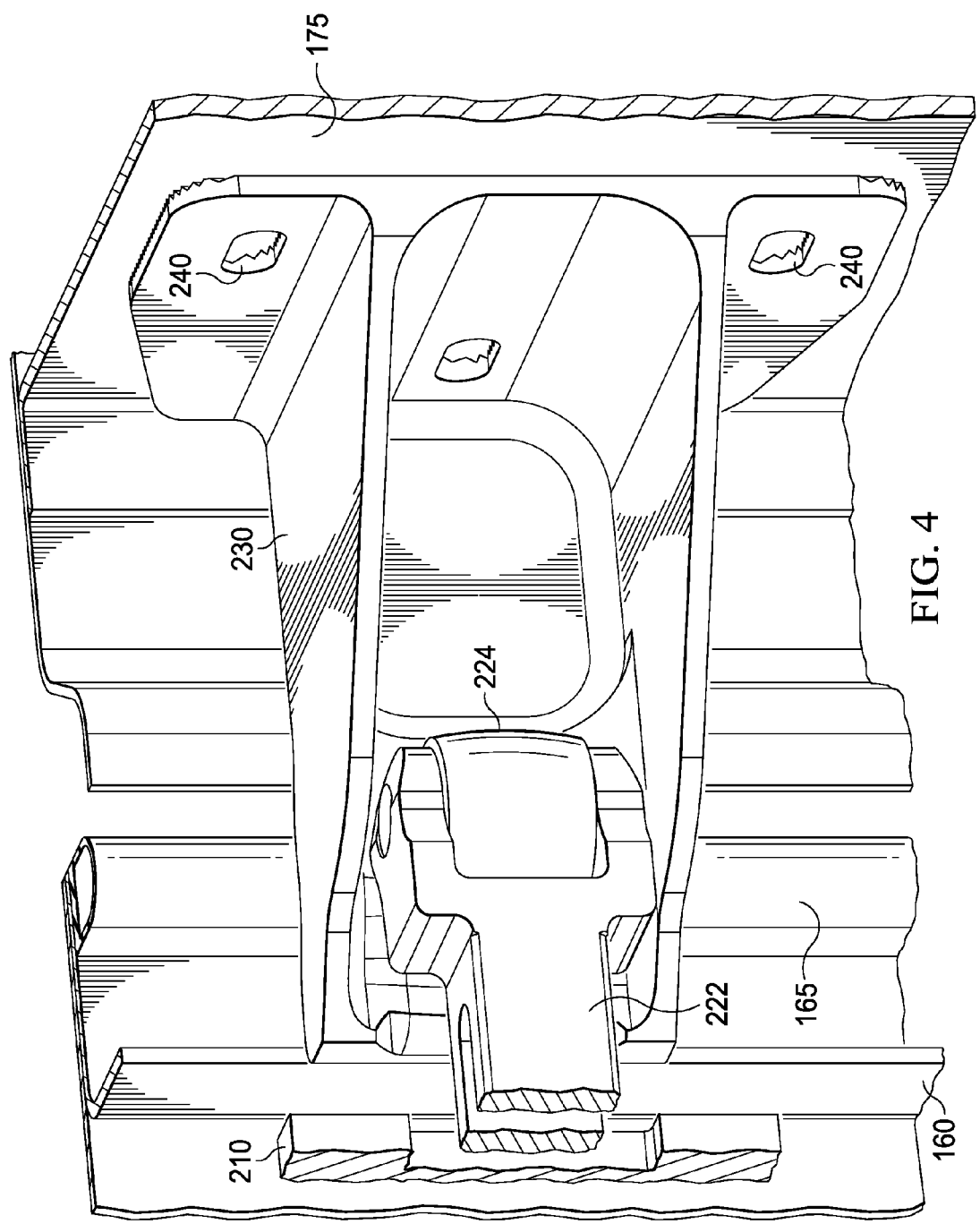
FIG. 4 shows a perspective view of the fork, roller element, receiver, and frame attachment device of the door latch system of FIG. 3.
Figure 5:
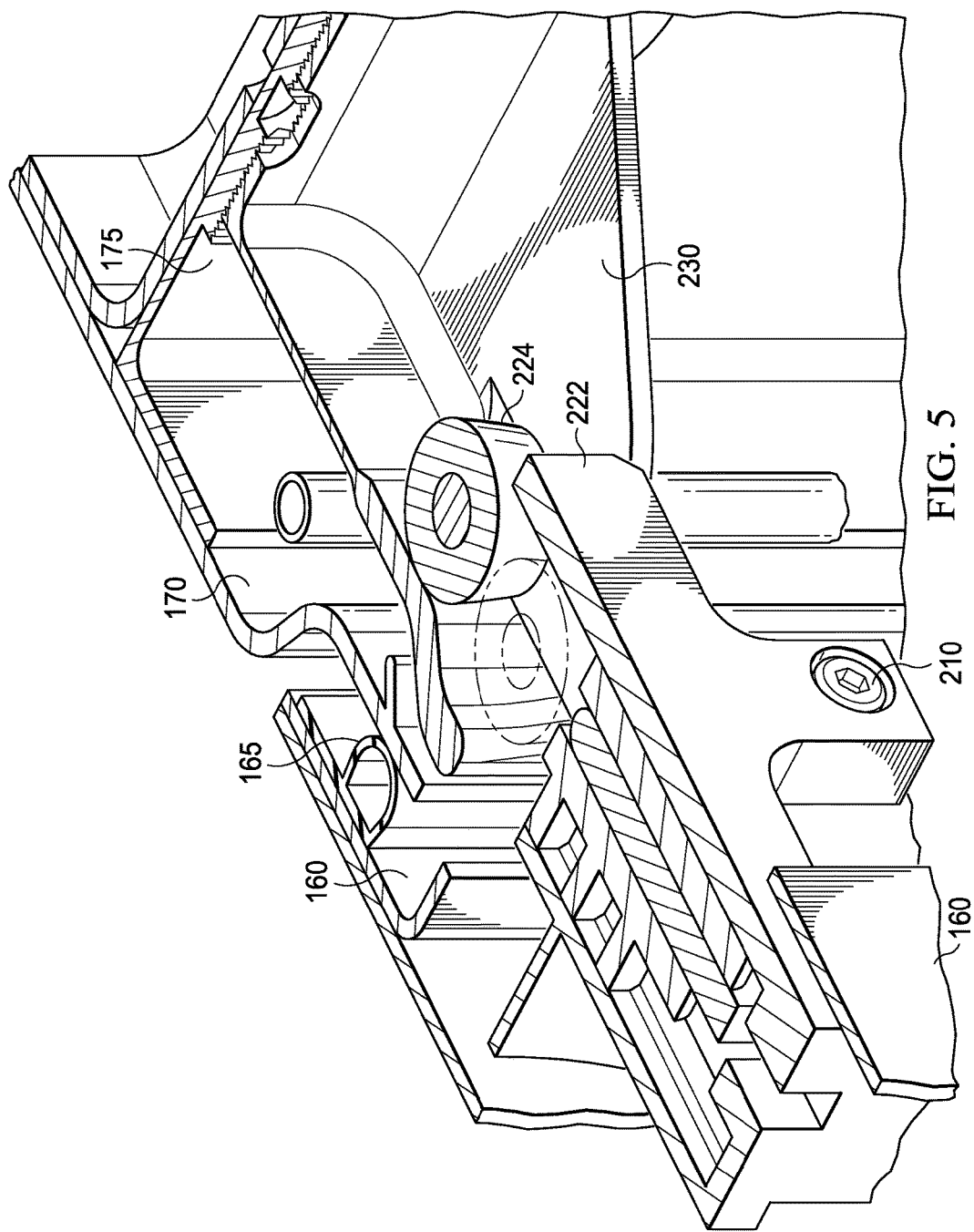
FIG. 5 shows a cross-section perspective view of the door latch system of FIG. 3.
Figure 6:
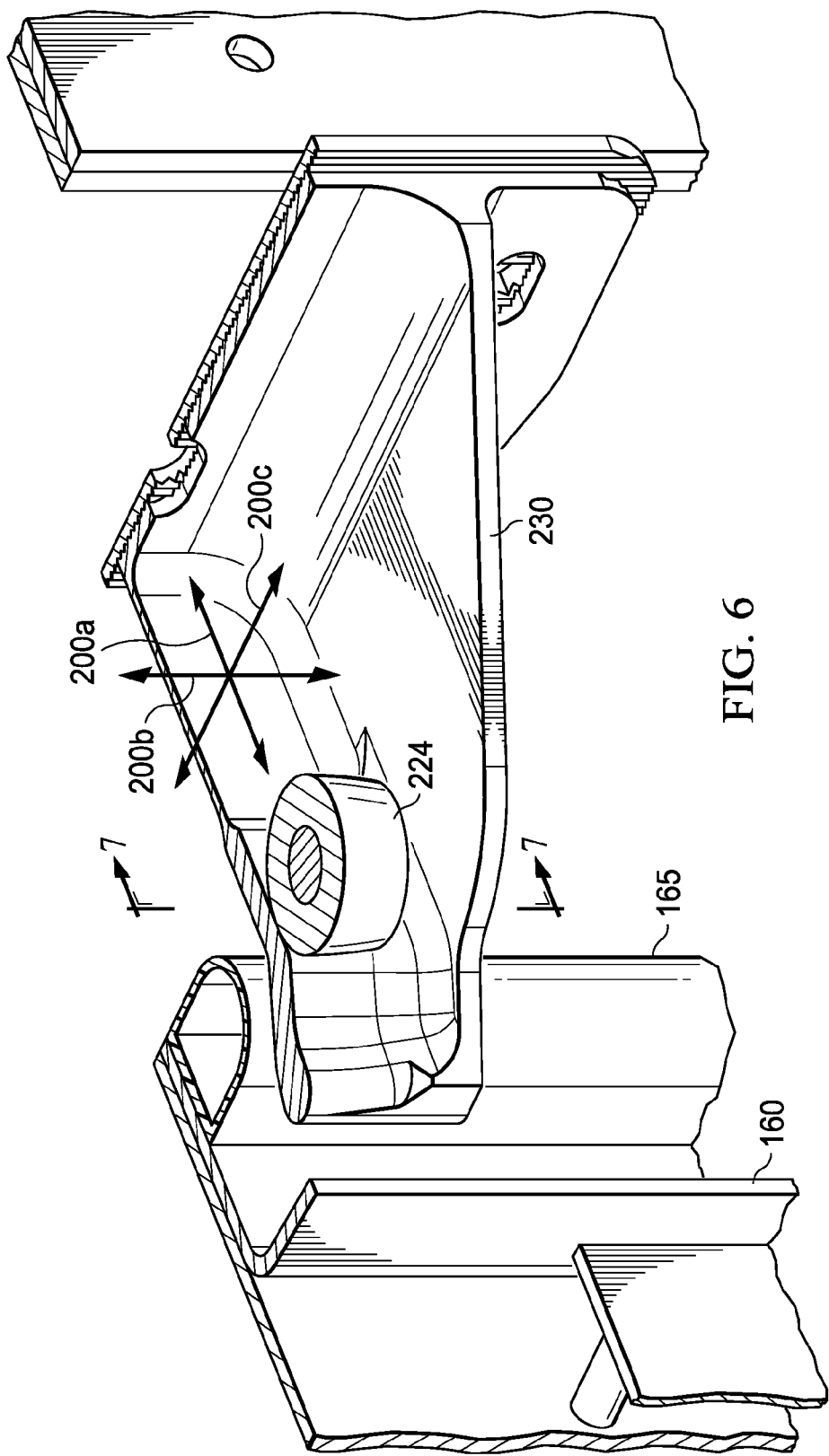
FIG. 6 shows a simplified view of the cross-section of FIG. 5 with elements such as the door attachment device and the fork removed.
Figure 7:
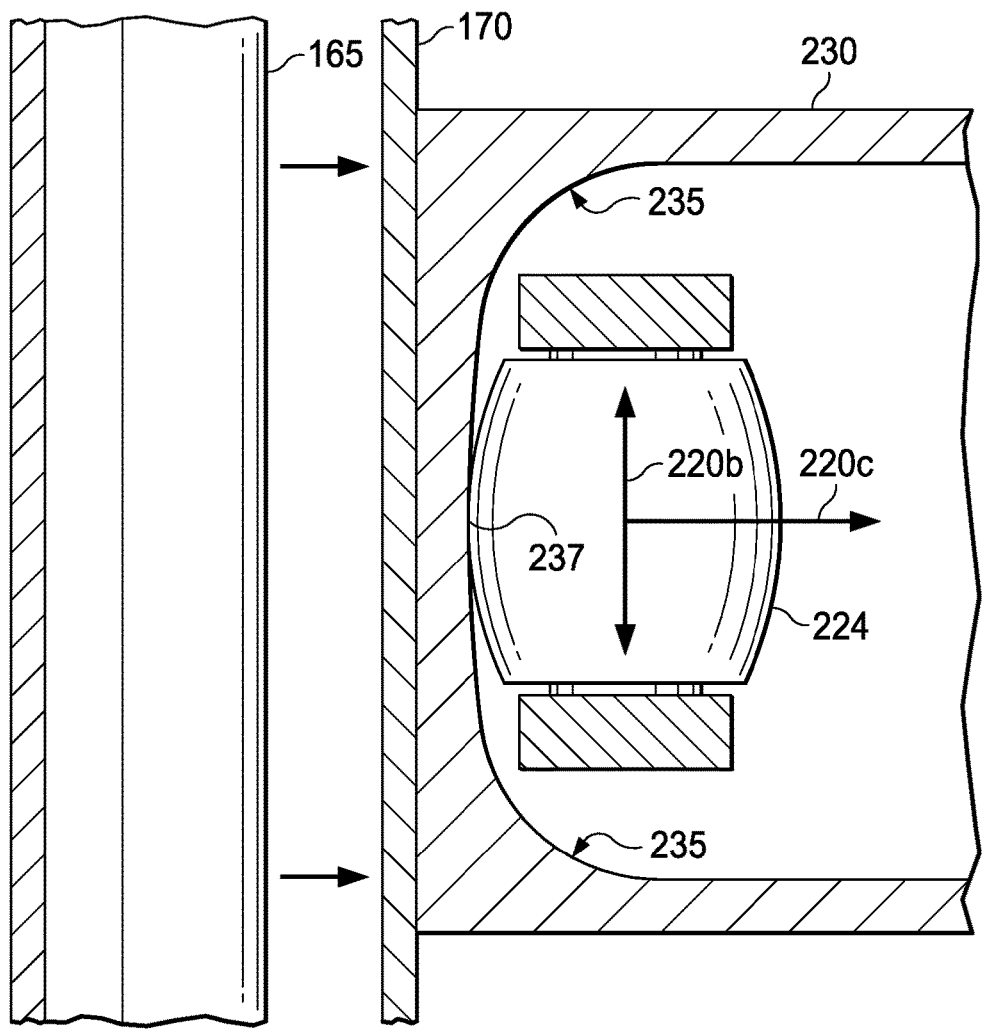
FIG. 7 shows a cross-section view of the roller element and receiver of FIG. 6.

FIGS. 2-7 show various views of a door latch system 200 according to one example embodiment. FIG. 2 shows a perspective view of two door latch systems 200 securing door 160 against a door frame 170 of rotorcraft 100. FIG. 3 shows a detailed perspective view of one of the door latch systems 200 of FIG. 2. In the example of FIG. 3, door latch system 200 includes a door attachment device 210, a roller assembly 220 (including a fork 222 and a roller element 224), a receiver 230, and a frame attachment device 240. FIG. 4 shows a perspective view of the fork 222, roller element 224, receiver 230, and frame attachment device 240 of the door latch system 200 of FIG. 3. FIG. 5 shows a cross-section perspective view of the door latch system 200 of FIG. 3. FIG. 6 shows a simplified view of the cross-section of FIG. 5 with elements such as door attachment device 210 and fork 222 removed. FIG. 7 shows a cross-section view of the roller element 224 and receiver 230 of FIG. 6.

In operation, according to one example embodiment, a door-sliding system may be configured to slide door 160 from an open position to a closed position within door frame 170. To slide door 160 open, a user may retract door handle 162, as seen in FIG. 2. Retracting door handle 162 may cause door attachment device 210 to retract fork 222 and roller element 224, as seen in FIG. 5. Retracting roller element 224 may disengages roller element 224 from receiver 230, which frees door 160 to slide away from door frame 170. To close door 160, a user may slide door 160 back towards door frame 170 until receiver 230 receives roller element 224 and door 160 is sealed against door frame 170 via door seal 165.

In the example of FIGS. 2 and 3, door attachment device 210 is coupled to door 160 and is in mechanical communication with door handle 162. Frame attachment device 240 couples receiver 230 to structure 175, which is located proximate to door frame 170. One example of frame attachment device 240 may include a bracket with one or more bolt holes. As seen in the example of FIG. 4, receiver 230 and frame attachment device 240 may manufactured as a single, integral component.

Teachings of certain embodiments recognize that each door latch system 200 may prevent or reduce migration of door 160. For example, door latch system 200 may respond to movement (e.g., migration) of door 160 by moving door 160 closer to door frame 170. Moving door 160 closer to door frame 170 may compress door seal 165 and result in a tighter seal between door 160 and door frame 170.

As seen in the example of FIGS. 6 and 7, receiver 230 may feature a non-planar receiving surface configured to move door 160 closer to door frame 170 in response to movement of door 160. This non-planar receiving surface, for example, may be oriented relative to door frame 170 such that roller assembly 220 causes door attachment device 210 to move door 160 closer to door frame 170 as roller assembly 220 moves along a path at least partially defined by the receiving surface.

For example, FIGS. 6 and 7 show a coordinate system with axes 200a, 200b, and 200c, and centered at a point of reference. As seen in the example of FIGS. 6 and 7, axis 200b is perpendicular to axis 200a, and axis 200c is perpendicular to the plane formed by axes 200a and 200b. Although axes 200a, 200b, and 200c are drawn relative to a single point of reference, teachings of certain embodiments recognize that this coordinate system may be defined relative to a variety of points of reference. In addition, axis 200c may be drawn in a variety of locations and not necessarily intersect at the same point where axes 200a and 200b intersect.

In the example of FIGS. 6 and 7, receiver 230 may be configured to receive roller element 224 in a direction parallel to axis 200a as door 160 is opened and closed. As seen in the example of FIG. 6, roller element 224 may move in the direction of axis 200c as receiver 230 receives roller element 224 in a direction parallel to axis 200a due to the curvature of receiver 230, but ideally roller element 224 would not move in a direction parallel to axis 200b. Roller element 224 may be prone to move in a direction parallel to axis 200b, as a result of vibrations and other forces. In some embodiments, movement of roller element 224 in a direction parallel to axis 200b may represent one example of door migration.

If roller element 224 does move in a direction parallel to axis 200b, receiver 230 may reposition roller element 224 in a direction parallel to axis 200c such that roller element 224 moves door 160 closer to door frame 170. For example, as seen in FIG. 7, receiver 230 may feature curved surface portions 235 separated by a surface portion 237. Surface portion 237 may be configured to at least partially receive roller element 224, but roller element 224 may move towards one of the curved surface portions 235 as a result of door migration. Curved surface portions 235 are configured relative to door frame 170 such that the distance between door frame 170 and curved surface portions 235 increases at various points along curved surface portions 235 as one moves further away from surface portion 237. In some embodiments, the curved surface portions 235 are symmetric to each other.

As roller element 224 rolls up or down (in a direction parallel to axis 200b), roller element 224 may roll from surface portion 237 to one of the curved surface portions 235. Curved surface portions 235 may be configured relative door frame 170 such that roller element 224 moves away from door frame 170 (in a direction parallel to axis 200c) as roller element 224 moves up or down away from surface portion 237 (in a direction parallel to axis 200b). Moving roller element 224 away from door frame 170 may cause door 160 to move closer to door frame 170 and form a tighter seal against door frame 170.

In this example, curved surface portions 235 and surface portion 237 may at least partially define a migration path of roller element 224. This migration path may include, for example, the path of roller element 224 as roller element 224 moves from surface portion 237 to one of the curved surface portions 235.

As roller element 224 migrates along one of the curved surface portions 235, the curved surface portion 235 may continue to move roller element 224 away from door frame 170 (in a direction parallel to axis 200c), which may cause door 160 to form a tighter seal against door frame 170. Teachings of certain embodiments recognize that door latch system 200 may eventually prevent further migration by creating a seal so tight between door 160 and door frame 170 that door 160 no longer migrates. For example, the seal between door 160 and door frame 170 may become so tight that the seal is stronger than the vibration forces that caused the initial migration.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An aircraft, comprising:
   a body comprising a door opening and a door frame at least partially surrounding the door opening;
   a power train coupled to the body and comprising a power source; and
   a door system coupled to the body, the door system comprising:
      a door coupled to the body proximate to the door opening;
      a door-sliding system configured to allow the door to slide from an open position to a closed position in a first direction parallel to a first axis;

a door attachment device coupled to the door; and
a receiver coupled to the body proximate to the door frame and comprising a receiving surface configured to at least partially receive the door attachment device as the door attachment device moves along the first axis and maintains physical contact with an elongated portion of the receiving surface, the receiving surface oriented relative to the door frame such that the door attachment device moves the door closer to the door frame as the door attachment device moves along a path at least partially defined by the receiving surface, the receiving surfacing having a non-planar portion curved relative to the first axis such that the receiving surface responds to movement of the door attachment device in a second direction parallel to a second axis, the second axis perpendicular to the first axis, by repositioning the door attachment device along the path in a third direction perpendicular to the plane formed by the first axis and the second axis.

2. The aircraft of claim 1, wherein the door attachment device comprises a rolling element configured to roll along at least part of the receiving surface.

3. The aircraft of claim 1, wherein the receiving surface comprises a first curved surface, a second curved surface, and a third surface separating the first curved surface from the second curved surface.

4. The aircraft of claim 3, wherein the path is at least partially defined by the first curved surface in a first path direction and at least partially defined by the second curved surface in a second path direction.

5. The aircraft of claim 3, wherein the first curved surface is symmetric to the second curved surface.

6. The aircraft of claim 3, wherein the third surface is configured to at least partially receive the door attachment device.

7. The aircraft of claim 3, wherein the path comprises a path of the door attachment device as the door attachment device moves from the third surface to one of the first surface or the second surface.

8. The aircraft of claim 1, wherein the receiving surface is oriented relative to the door frame such that the door forms a tighter seal against the door frame as the door attachment device moves along the path at least partially defined by the receiving surface.

9. The aircraft of claim 1, wherein the receiving surface is oriented relative to the door frame such that a distance between the receiving surface and the door frame increases at subsequent positions along the path.

10. An aircraft door system, comprising:
a door-sliding system configured to allow a door to slide from an open position to a closed position in a first direction parallel to a first axis;
a door attachment device coupled to the door; and
a receiver comprising a receiving surface configured to at least partially receive the door attachment device as the door attachment device moves along the first axis and maintains physical contact with an elongated portion of the receiving surface, the receiving surface having a non-planar portion curved relative to the first axis such that the receiving surface responds to movement of the door attachment device in a direction parallel to a second axis, the second axis perpendicular to the first axis, by repositioning the door attachment device in a third direction perpendicular to the plane formed by the first axis and the second axis.

11. The aircraft door system of claim 10, wherein the door attachment device comprises a rolling element configured to roll along at least part of the receiving surface.

12. The aircraft door system of claim 10, wherein the receiving surface comprises a first curved surface, a second curved surface, and a third surface separating the first curved surface from the second curved surface.

13. The aircraft door system of claim 12, wherein the third surface at least partially defines the first axis.

14. The aircraft door system of claim 12, wherein the third surface is configured to at least partially receive the door attachment device.

15. The aircraft door system of claim 12, wherein the first curved surface responds to movement of the door attachment device from the third surface to the first surface by repositioning the door attachment device in the third direction perpendicular to the plane formed by the first axis and the second axis.

16. The aircraft door system of claim 12, wherein the second curved surface responds to movement of the door attachment device from the third surface to the second surface by repositioning the door attachment device in the third direction perpendicular to the plane formed by the first axis and the second axis.

17. A method of reducing migration of an aircraft door, comprising:
sliding a door in a first direction parallel to a first axis between an open position and a closed position;
receiving, in the first direction, a door attachment device coupled to the door such that the door attachment device maintains physical contact with an elongated portion of a receiving surface, the receiving surface having a non-planar portion curved relative to the first axis;
responding, by the receiving surface, to movement of the door attachment device in a second direction parallel to a second axis, the second axis perpendicular to the first axis, by repositioning the door attachment device in a third direction perpendicular to the plane formed by the first axis and the second axis.

18. The method of claim 17, wherein repositioning of the door attachment device in the third direction seals the door tighter against a door frame.

19. The method of claim 17, further comprising:
responding to additional movement of the door attachment device in the second direction by repositioning the door attachment device in the third direction at least until the door attachment device seals the door against the door frame such that the seal prevents further movement of the door attachment device in the second direction.

20. The aircraft of claim 1, the door system further comprising a door handle movable between an engagement position and a retraction position, the door handle in mechanical communication with the door attachment device such that moving the door handle from the engagement position to the retraction position causes the door attachment device to disengage the receiver and allow the door to slide freely from the closed position to the open position.

* * * * *